United States Patent [19]

Ogden

[11] B  3,981,602

[45] Sept. 21, 1976

[54] VEHICLE RETARDATION

[75] Inventor: Dennis H. Ogden, Wolverhampton, England

[73] Assignee: British Industrial Plastics Limited, England

[22] Filed: Mar. 19, 1974

[21] Appl. No.: 452,672

[44] Published under the second Trial Voluntary Protest Program on January 13, 1976 as document No. B 452,672.

[30] Foreign Application Priority Data

Mar. 23, 1973 United Kingdom............... 14107/73

[52] U.S. Cl. ............................. 404/71; 260/2.5 F; 427/407; 428/218; 428/315; 428/524
[51] Int. Cl.² ......................... E01C 7/00; C08J 9/00
[58] Field of Search............ 117/72, 161 L, 161 LN; 404/75, 71, 27, 31; 260/2.5 F; 427/407; 428/218, 315, 524

[56] References Cited

UNITED STATES PATENTS 3,511,689   5/1970   Winkler ................................ 117/70

FOREIGN PATENTS OR APPLICATIONS 1,282,103   7/1972   United Kingdom
1,313,103   4/1973   United Kingdom

*Primary Examiner*—Michael R. Lusignan
*Attorney, Agent, or Firm*—Cushman, Darby & Cushman

[57] ABSTRACT

A vehicle deceleration bed comprises two portions of a cured non-resilient aminoplast resin foam material, the density and/or the compressive strength of the foam in one portion being different from that of the other portion. Preferably the portions are arranged in layers and in the case of an aircraft deceleration bed, the lowermost layer is the strongest, each such successive layer being of progressively lower strength.

9 Claims, No Drawings

VEHICLE RETARDATION

The present invention relates to the deceleration of aircraft and other vehicles. In particular, the present invention is concerned with an improvement in or modification of the deceleration bed described and claimed in the specification of our U.K. Pat. No. 1,282,103, hereinafter referred to as the parent specification.

In the aforesaid parent specification we disclosed a deceleration bed comprising a crushable cured aminoplast foam of specified strength and density.

Although the aforesaid deceleration bed is effective for the broad class of vehicles which it is designed to arrest, certain problems may arise when it is desired to decelerate vehicles of greater weight or weights. In the case of aircraft, recent developments have resulted in the situation where the weight, wheel configuration and anticipated entry speed may now all vary within wider limits than was hitherto envisaged. Thus, whilst a relatively dense and strong deceleration bed may be designed and constructed to be perfectly adequate for a very large and heavy aircraft, such as the new Boeing 747, a lighter aircraft might roll straight across the surface of the same bed, if its weight is insufficient to crush the foam. This is because aircraft of the 747 type having very heavy tyre/wheel loadings require the use of appreciably harder foams than have hitherto been considered desirable so as to obtain a satisfactory rate of deceleration. Such harder foams would either apply an excessive deceleration to a lighter aircraft or, more probably, would damage it.

In the case of railway trains, deceleration must, for example, be effected as far as possible without the train being displaced from the rails by the foam or the running gear damaged.

According to the present invention, we provide a vehicle deceleration bed comprising at least two portions of a cured non-resilient aminoplast resin foam material, the density and/or compressive strength (as hereinafter defined) of the foam in one portion being different from that of the other portion.

The portions may be arranged in the form of layers and in the case of a bed intended to decelerate an aircraft, we prefer that the strongest layer be the lowermost, with each successive layer having a progressively lower strength. The lowermost layer in this case will normally be the groundcontacting layer of the bed.

According to a particularly preferred aspect of the present invention, we provide an aircraft deceleration bed having at least two layers of a non-resilient cured foam of an aminoplast resin material which has a compressive strength (as hereinafter defined) of at least 135 KN/m$^2$ and a density of from about 16 to 160 Kg/m$^3$, the compressive strength in the lowermost layer being greater than that of the other layer or layers.

"Compressive strength" in the present context does not mean exactly the same as in the parent specification, because we have found it more convenient to measure foam strength on site by a "plunger" test, in which a plunger is driven into the foam, the load required being monitored by a modified spring balance. This method tends to give somewhat higher and less accurate strength figures than the test previously employed, but it is much easier to apply.

We have found that by employing more than one layer in the deceleration bed, it is possible to provide a bed capable of dealing with a wider range of vehicles than would be possible with a single layer bed because a light vehicle will only penetrate that layer, or layers, which are of sufficiently low compressive strength in relation to the individual wheel loading weight of that particular vehicle, the stronger layer or layers underneath playing no part, or at least, very little part in decelerating the vehicle. A heavier vehicle however will be effectively decelerated by both foam layers. Obviously, the same applies where different wheels of an individual vehicle have widely differing loadings so that one may penetrate only one layer and one may penetrate more than one layer. For example, with a heavy aircraft, the nose wheel may be more lightly loaded than the main landing wheels so that the latter penetrate into a layer beneath that penetrated by the former.

However, in the very different special case of a railway train, we prefer that the lowermost portion of the bed has only sufficient strength to support the portion or portions above it. This is because of the requirement that the train shall, as far as possible, remain on the rails. By making the lowermost portion of the bed relatively soft, it will be less likely to displace the train from the rails or to damage the wheels, bogies and other running gear. At the same time, it will reduce the chance of pieces of the stronger foam from falling to a position where they might become jammed beneath the train.

According to a further aspect of the present invention, we provide a method of forming in situ a deceleration bed, comprising the steps of forming a first curable foam from an aminoplast resin material, depositing said foam as a layer in a desired location, curing the foam to give a non-resilient cured foam, forming a second curable foam from an aminoplast resin material, depositing said second foam as a layer on top of the first foam layer and curing the foam to give a non-resilient cured foam having a different density and/or compressive strength to that of the first cured foam.

Further layers of non-resilient cured foam may be provided in like manner, the compressive strength of each successive layer being preferably, but not necessarily, progressively lower or higher than that of the layer immediately beneath, as the case may be.

EXAMPLE 1

A urea/formaldehyde resin foam was prepared by the method of U.K. Pat. Specification No. 1,313,103 and laid on a prepared site at one end of an airfield runway as a layer approximately 0.32 meter thick. The resin formulation and foaming conditions were arranged to produce a foam which when cured and dry had a density of 64 Kg/m$^3$ and a compressive strength of about 586 KN/m$^2$. When the newly laid foam had cured sufficiently, a second foam layer of thickness of 0.61 meter was laid on top and allowed to cure. The foam for the second layer was formulated so as to produce a cured, dry foam of density 48 Kg/m$^3$ and a compressive strength about 345 KN/m$^2$. The end of the bed immediately adjacent the end of the runway was tapered down to runway level, at an angle of about 30°, in order to provide an entry zone of gradually increasing thickness. Both layers of the bed were tapered during the laying operation, although it is also possible to shape the first layer after curing but before applying the second layer.

The calculated performance of the bed just described is illustrated by the following table which lists aircraft types, their maximum take-off weights and the calculated retardations which would be obtained, firstly in a single layer of foam corresponding to the 0.32 meter layer above; secondly, in a single layer of the same foam 0.91 meter thick and thirdly, in the two-layer bed itself.

| Aircraft and Model | Maximum Take-Off Wt. Kg × 10³ | Calculated Retardation 0.32m Single-Layer Bed (g) | Calculated Retardation 0.91m Single-Layer Bed (g) | Calculated Retardation Two-Layer Bed (g) |
|---|---|---|---|---|
| 737 (SS 100) | 44 | 1.2 | 3.6 | 1.2 |
| 727 (100 A) | 64.4 | 1.0 | 3.0 | 1.0 |
| 707 (120 B) | 116.6 | 0.3 | 0.9 | 0.6 |
| 747 | 322 | 0.2 | 0.6 | 0.5 |

The maximum safe deceleration is about 1.2g, normal braking giving about 0.3g. From the table, it is clear that the single-layer 0.91 meter bed of foam would seriously damage the 737 and 727 aircraft. However, the two-layer bed is an acceptable compromise for all the aircraft, despite the wide difference in weight between the 747 and the 737. A single-layer bed can only cope with a certain weight range, but the two (or more) layer bed allows the use of much harder foam than was previously possible, thereby greatly increasing the useful operating range of the bed.

In practical terms, the type of aircraft which may have to be decelerated in an emergency is not foreseeable and, therefore, it is essential to provide for as many different aircraft as possible. Clearly, the provision of a bed having at least two layers offers significant advantage over any single-layer bed.

EXAMPLE 2

A urea/formaldehyde resin foam was prepared by the same method as in Example 1 and laid along a 275 meter stretch of railway line. The resin formulation and foaming conditions were arranged to provide a deposit of relatively soft foam having a density of about 10 Kg/m³ and a compressive strength of 7–14 KN/m², merely covering the rails to a depth of about 70cm. When this portion had cured sufficiently, it was enveloped in a second foam portion, the resin formulation being adjusted to give a cured foam of approximate density 40–50 Kg/m³ and a compressive strength of about 350 KN/m². The thickness of the finished bed was about 1.7 meters. The bed was tested by projecting a "mock-up" of a locomotive, weighing 66 tonnes, into one end of it at a speed of about 96 kph. The vehicle was safely brought to a halt in a distance of about 200 meters by the retarding forces exerted by the denser foam acting on the nose and sides of the locomotive, whilst the wheels and bogies, being aligned with the soft inner portion of the bed were subjected only to small stresses, thereby protecting them from damage and ovbiating derailment of the locomotive in the bed.

I claim:

1. A vehicle deceleration bed comprising at least two layers of a non-resilient cured foam of an aminoplast resin material laid on a vehicle trackway, the layers being coextensive and in superposed relation to one another, the density and compressive strength properties of the foam in each layer being sensibly constant throughout said layer, but different from the density and compressive strength properties of any other layer.

2. A vehicle deceleration bed according to claim 1 wherein the compressive strength of the foam material in the lower layer, which layer in contact with the vehicle trackway, is greater than that of the upper layer.

3. An aircraft deceleration bed according to claim 2 wherein the compressive strength of the foam material in the lower layer is at least 135 KN/m² and its density is in the range of from about 16 to 160 Kg/m³.

4. A vehicle deceleration bed according to claim 1 comprising three layers of a non-resilient cured aminoplast resin foam.

5. A vehicle deceleration bed according to claim 4 wherein the compressive strength of the lowermost layer is greater than that of either of the two other layers.

6. A vehicle deceleration bed according to claim 4 wherein the compressive strength of each successive layer is less than that of the layer immediately beneath it.

7. A vehicle deceleration bed according to claim 1 wherein the compressive strength and density of the lower layer is sufficient to support the other layer without contributing significantly to the decelerating properties of the bed.

8. A deceleration bed according to claim 7 wherein the compressive strength and density of the supporting layer of the bed are respectively no greater than about 35 KN/m² and 24 Kg/m³.

9. A method of forming in situ a vehicle decleration bed, comprising the steps of forming a first curable foam from an aminoplast resin material, depositing said foam as a layer in a desired location on a vehicle trackway and curing the foam to give a non-resilient cured foam, forming a second curable foam from an aminoplast resin material, depositing said second foam as a layer on top of the first foam layer and curing the foam to give a non-resilient cured foam having a different density and compressive strength to that of the first cured foam, the density and compressive strength properties of the foam in each of said layers being substantially constant through each such layer.

* * * * *